United States Patent
Beghtol et al.

(10) Patent No.: US 10,055,626 B2
(45) Date of Patent: Aug. 21, 2018

(54) DATA READING SYSTEM AND METHOD WITH USER FEEDBACK FOR IMPROVED EXCEPTION HANDLING AND ITEM MODELING

(71) Applicant: Datalogic USA, Inc., Eugene, OR (US)

(72) Inventors: Justin Beghtol, Santa Ana, CA (US); Mohamed Hamidat, Les Ulis (FR); Michael P. Svetal, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 0 days.

(21) Appl. No.: 15/371,083

(22) Filed: Dec. 6, 2016

(65) Prior Publication Data

US 2018/0157881 A1 Jun. 7, 2018

(51) Int. Cl.
*G06K 15/00* (2006.01)
*G06K 7/10* (2006.01)

(52) U.S. Cl.
CPC ..... *G06K 7/10792* (2013.01); *G06K 7/10861* (2013.01)

(58) Field of Classification Search
CPC .. G06Q 20/208; G07G 1/0036; G07G 1/0045; G07G 1/0054; G07G 1/0063; G07G 1/0072; G07G 3/006
See application file for complete search history.

(56) References Cited

U.S. PATENT DOCUMENTS

| 4,679,154 A | 7/1987 | Blanford |
| 4,850,009 A | 7/1989 | Zook et al. |
| 4,939,355 A | 7/1990 | Rando et al. |
| 5,494,136 A | 2/1996 | Humble |
| 5,497,314 A | 3/1996 | Novak |
| 5,525,786 A | 6/1996 | Dumont |
| 5,572,019 A | 11/1996 | Tsuyoshi |
| 5,641,039 A | 6/1997 | Dumont |

(Continued)

FOREIGN PATENT DOCUMENTS

| EP | 2211153 | 7/2010 |
| JP | 3-238573 | 10/2001 |

(Continued)

OTHER PUBLICATIONS

US 8,348,169, 01/2013, Wang et al. (withdrawn)

(Continued)

*Primary Examiner* — Steven S Paik
*Assistant Examiner* — April Taylor
(74) *Attorney, Agent, or Firm* — Stoel Rives LLP

(57) ABSTRACT

A checkout system for data reading, and related methods of use, the checkout system including one or more data reading devices with a conveyor for transporting items toward a read zone of the data reading devices, and an exception identification system capable of identifying exception items transported through the read zone without being successfully identified by the data reader. The checkout system includes an exception handling system operable to receive exception handling input for resolving an exception associated with the exception item, and a feedback system for receiving the exception handling input and determining whether and how to adjust an object recognition model of the data reading devices to improve performance.

16 Claims, 5 Drawing Sheets

(56) References Cited

U.S. PATENT DOCUMENTS

| | | | |
|---|---|---|---|
| 6,050,731 A | 4/2000 | Matsui | |
| 6,330,973 B1* | 12/2001 | Bridgelall | G06K 7/10564 235/462.01 |
| 6,336,053 B1 | 1/2002 | Lennevi | |
| 6,396,516 B1 | 5/2002 | Beatty | |
| 6,687,580 B2 | 2/2004 | Iguchi et al. | |
| 6,711,293 B1 | 3/2004 | Lowe | |
| 6,827,266 B2 | 12/2004 | Mergenthaler et al. | |
| 7,010,501 B1 | 3/2006 | Roslak et al. | |
| 7,040,455 B2 | 5/2006 | Crockett et al. | |
| 7,059,527 B2 | 6/2006 | Mergenthaler et al. | |
| 7,066,388 B2 | 6/2006 | He | |
| 7,118,026 B2 | 10/2006 | Harris et al. | |
| 7,168,525 B1 | 1/2007 | Jacobs | |
| 7,207,477 B1 | 4/2007 | Ramachandran | |
| 7,209,891 B1 | 4/2007 | Addy et al. | |
| 7,325,729 B2 | 2/2008 | Crockett et al. | |
| 7,422,147 B2 | 9/2008 | Rosenbaum | |
| 7,461,785 B2 | 12/2008 | Crockett et al. | |
| 7,578,442 B2 | 8/2009 | Knowles et al. | |
| 7,599,543 B2 | 10/2009 | Jones et al. | |
| 7,602,956 B2 | 10/2009 | Jones et al. | |
| 7,660,739 B2 | 2/2010 | Fowler | |
| 7,905,412 B2 | 3/2011 | Maeda et al. | |
| 7,909,248 B1 | 3/2011 | Goncalves | |
| 8,033,470 B2 | 10/2011 | Maeda et al. | |
| 8,068,674 B2 | 11/2011 | Goncalves | |
| 8,072,651 B2 | 12/2011 | Bozzi et al. | |
| 8,196,822 B2 | 6/2012 | Goncalves | |
| 8,353,457 B2 | 1/2013 | Olmstead | |
| 8,396,278 B2 | 3/2013 | Jones et al. | |
| 8,430,311 B2* | 4/2013 | Ostrowski | A47F 11/10 235/383 |
| 8,448,859 B2 | 5/2013 | Goncalves et al. | |
| 8,489,322 B2 | 7/2013 | Miyajima | |
| 8,494,909 B2* | 7/2013 | Goncalves | G06Q 20/203 382/100 |
| 8,539,385 B2 | 9/2013 | Capela et al. | |
| 8,939,369 B2* | 1/2015 | Olmstead | G06K 7/10722 235/438 |
| 8,985,444 B2* | 3/2015 | Hammer | A47F 9/046 235/383 |
| 9,082,142 B2 | 7/2015 | Svetal | |
| 9,202,117 B2* | 12/2015 | Kundu | G06Q 20/00 |
| 9,239,943 B2 | 1/2016 | Svetal | |
| 9,268,979 B2* | 2/2016 | Thompson | G06K 7/0095 |
| 2003/0047387 A1 | 3/2003 | Bogat | |
| 2006/0131402 A1 | 6/2006 | Crockett et al. | |
| 2006/0243798 A1 | 11/2006 | Kundu et al. | |
| 2006/0261157 A1 | 11/2006 | Kundu et al. | |
| 2006/0282331 A1 | 12/2006 | Jacobs | |
| 2007/0057049 A9 | 3/2007 | Kundu et al. | |
| 2007/0158417 A1* | 7/2007 | Brewington | G06Q 30/06 235/383 |
| 2008/0011846 A1 | 1/2008 | Cato | |
| 2008/0048029 A1 | 2/2008 | Crockett et al. | |
| 2008/0078833 A1 | 4/2008 | Crockett et al. | |
| 2008/0116278 A1 | 5/2008 | Epshteyn | |
| 2008/0308630 A1 | 12/2008 | Bhogal et al. | |
| 2009/0021375 A1 | 1/2009 | Stagg | |
| 2009/0039164 A1 | 2/2009 | Herwig et al. | |
| 2009/0084854 A1 | 4/2009 | Carlson et al. | |
| 2009/0212113 A1 | 8/2009 | Chiu et al. | |
| 2010/0059589 A1 | 3/2010 | Goncalves et al. | |
| 2010/0138304 A1 | 6/2010 | Boyarsky et al. | |
| 2010/0217678 A1* | 8/2010 | Goncalves | G06Q 20/203 705/22 |
| 2011/0060426 A1 | 3/2011 | Morton | |
| 2011/0075931 A1 | 3/2011 | Chiou et al. | |
| 2011/0191196 A1 | 8/2011 | Orr et al. | |
| 2011/0279272 A1 | 11/2011 | Wieth et al. | |
| 2011/0286628 A1 | 11/2011 | Goncalves et al. | |
| 2011/0320296 A1 | 12/2011 | Edwards | |
| 2012/0153662 A1 | 6/2012 | MacNeil et al. | |
| 2012/0187191 A1 | 7/2012 | Olmstead | |
| 2012/0187195 A1 | 7/2012 | Actis et al. | |
| 2013/0001295 A1* | 1/2013 | Goncalves | G07G 1/0063 235/375 |
| 2013/0020391 A1 | 1/2013 | Olmstead et al. | |
| 2013/0020392 A1 | 1/2013 | Olmstead et al. | |
| 2013/0175339 A1 | 7/2013 | Svetal | |
| 2013/0206838 A1 | 8/2013 | Nahill et al. | |
| 2013/0223673 A1 | 8/2013 | Davis et al. | |
| 2015/0193761 A1 | 7/2015 | Svetal | |
| 2015/0347801 A1 | 12/2015 | Svetal | |

FOREIGN PATENT DOCUMENTS

| | | |
|---|---|---|
| JP | 2006309264 A | 11/2006 |
| JP | 2013021519 | 1/2013 |
| KR | 10-2009-0121191 | 11/2009 |
| KR | 10-2010-0126417 | 12/2010 |
| KR | 10-2011-0070991 | 6/2011 |
| WO | WO 2002/037432 | 5/2002 |
| WO | WO 2007/038348 A1 | 4/2007 |
| WO | WO 2012/103139 | 8/2012 |
| WO | WO 2013/090023 | 6/2013 |
| WO | WO 2013/150604 | 10/2013 |

OTHER PUBLICATIONS

Evolution Robotics: *Brochure: ViPR® Giving Products the Ability to See*, downloaded from https://web.archive.org/web/20100710090822/http://www.evolution.com/core/ViPR/ (Internet Archive date Jul. 2010) visited Oct. 31, 2013.

International Searching Authority, International Search Report and Written Opinion for PCT/US2013/051042, dated Sep. 27, 2013.

* cited by examiner

DATA READING SYSTEM AND METHOD WITH USER FEEDBACK FOR IMPROVED EXCEPTION HANDLING AND ITEM MODELING

BACKGROUND

The field of this disclosure relates generally to systems and methods of data reading, and more particularly, to systems and methods for identifying and resolving errors made during data reading.

Optical codes, such as barcodes, digital watermarks or other optically encoded information, encode optically-readable data about the objects to which they are attached or otherwise associated. Barcodes are found on or associated with objects of various types, such as on the packaging of retail, wholesale, and inventory goods; retail product presentation fixtures (e.g., shelves); goods undergoing manufacturing; personal or company assets; and documents. By encoding information, a barcode typically serves as an identifier of an object, whether the identification be to a class of objects (e.g., merchandise) or to a unique item (e.g, patents).

Various types of data readers, also known as scanners, such as manual readers, semi-automatic readers and automated readers, are available to acquire and decode the information encoded in optical codes. In a manual reader (e.g., a hand-held type reader, or a fixed-position reader), a human operator positions an object relative to the reader to read the optical code associated with the object. In a semi-automated reader, either checker-assisted or self-checkout, objects are moved one at a time by the user into or through the read zone of the reader and the reader then reads the optical code on the object. In an automated reader (e.g., a tunnel or portal scanner), an object is automatically positioned (e.g., transported through the read zone via a conveyor) relative to the reader, with the reader automatically reading the optical code on the object when the object passes through the read zone.

In some instances, a data reader may encounter errors when attempting to read an optical code on an object or the reader may simply fail to read the optical code. For example, a barcode may be obscured by neighboring items, or an item may be missing a barcode, or a barcode may be difficult to read due to label quality or specular reflection issues. When a read error or read failure occurs, an operator may take any one of a variety of suitable actions to attempt to resolve the problem. For example, in some instances, the operator may rescan the optical code (e.g., such as by using a hand-held scanner), or may manually enter an item identification number (e.g., a UPC number) corresponding to the object into the system.

Other data readers may include exception handling systems operable to determine whether an error or an unexpected event occurred, and in response, take appropriate action to resolve the error. In some systems, the exception handling system may resolve the exception and prompt the operator to confirm the solution. In cases where an error cannot be resolved automatically, the exception handling system may identify the error and present possible solutions to an operator on a display. For example, if the data reader captured a partial barcode or a partial image of the item, the exception handling system may present exception images to the operator for items that have matching barcode portions or matching images. In such systems, the operator may resolve the error by selecting the exception image that best matches the item being processed.

The present inventors have determined that it would be desirable to have a data reader with improved performance features for scoring the dependability of individual users/operators performing the exception handling actions to enhance the accuracy of the data reading process. The present inventors have also identified a need for such a data reader operable to analyze feedback received from the users/operators to improve the accuracy of the data reading process. Additional aspects and advantages of such data reading systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, it should be understood that an automated checkout system in a retail establishment is merely one use for such a system and should not be considered as limiting. An automated checkout system with the characteristics and features described herein may alternatively be used, for example, in an industrial location such as a parcel distribution center (e.g., postal), warehouse, luggage distribution center, or in a retail goods distribution center.

Figure 1:
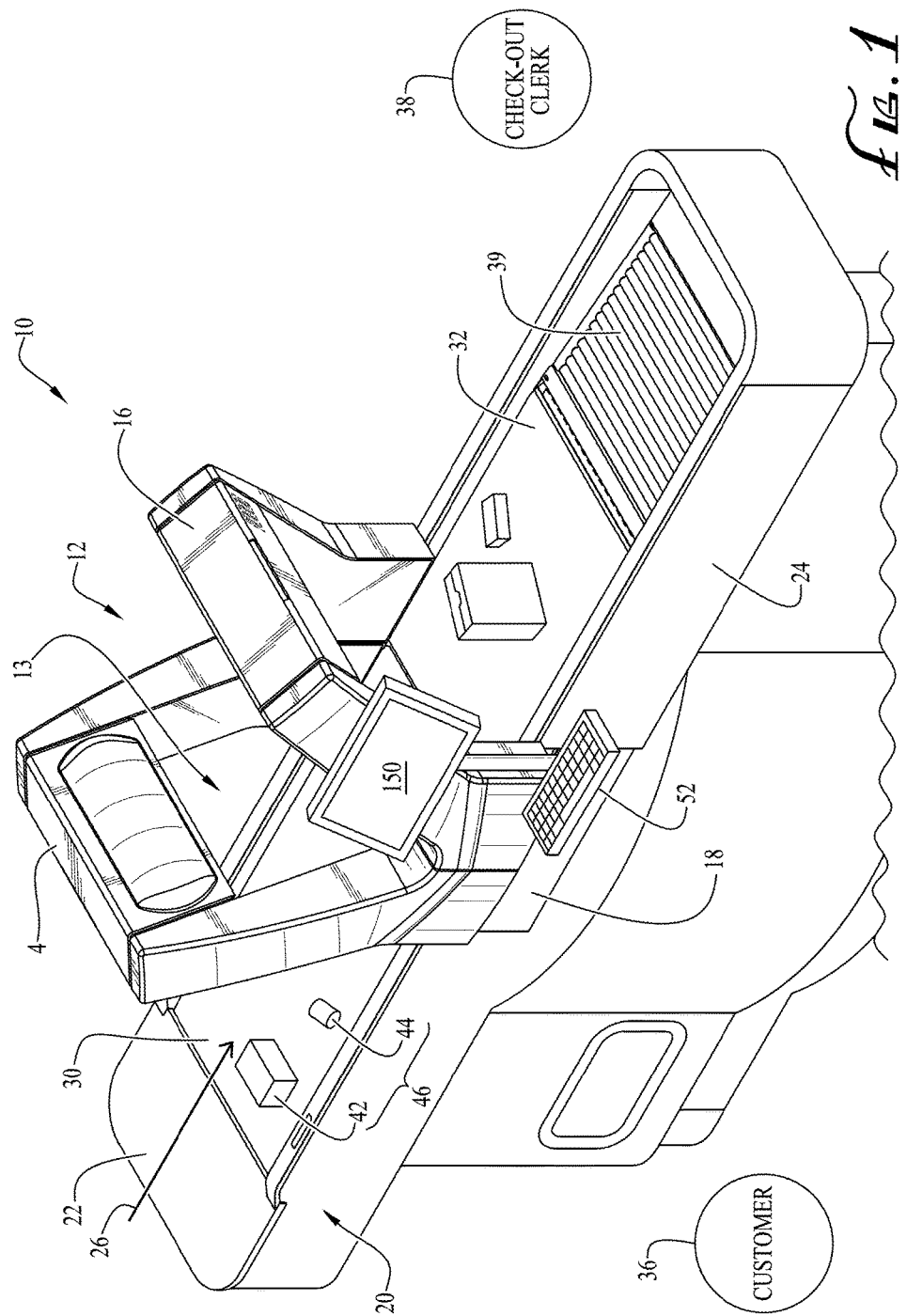
FIG. 1 is an isometric view of an automated data reading system, according to one embodiment.
Figure 2:
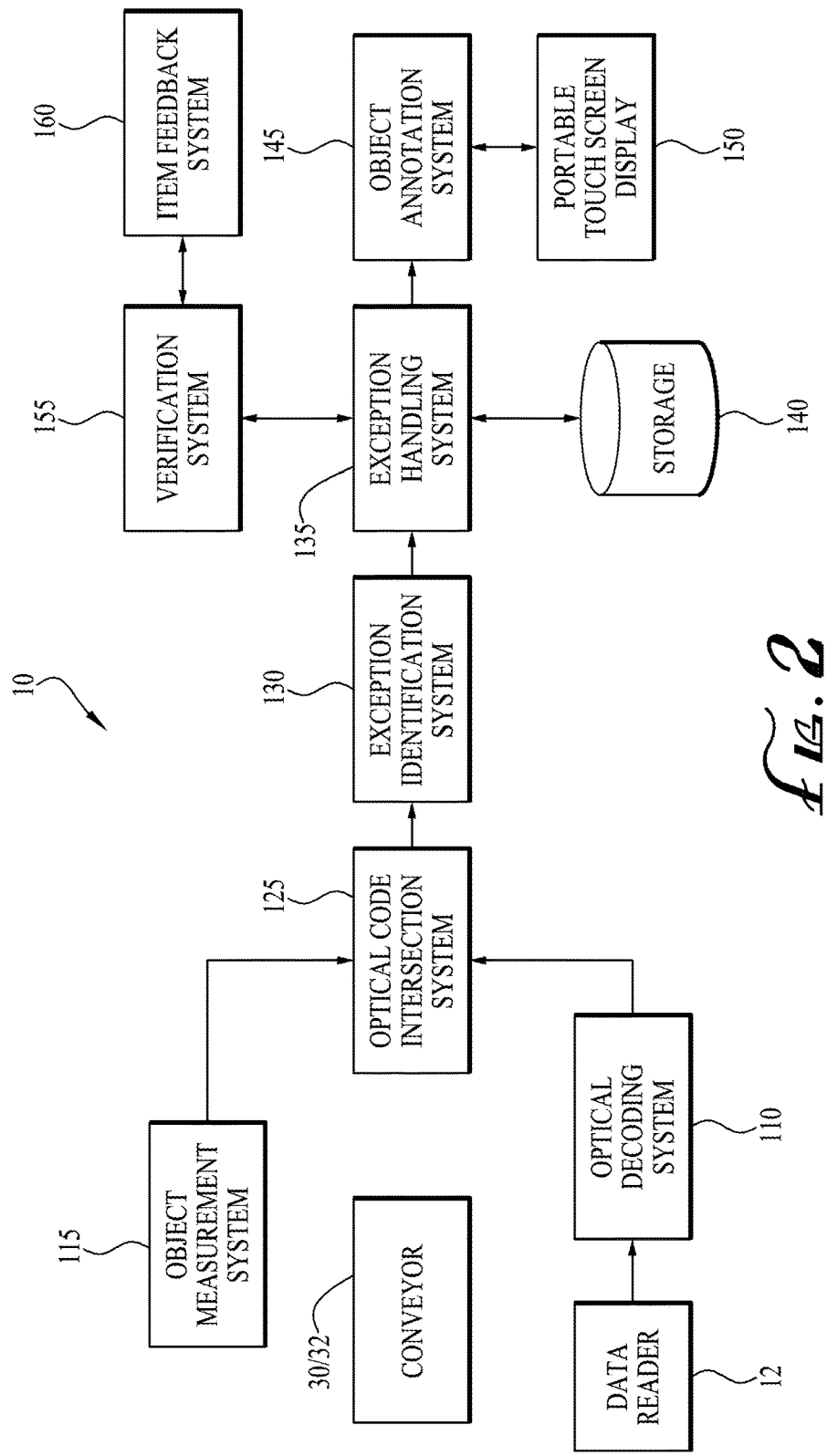
FIG. 2 is a block diagram of an automated optical code reading system, according to one embodiment.

FIGS. 1-2 collectively illustrate an automated checkout system 10 according to one embodiment. As is discussed in further detail below, the automated checkout system 10 may be used to identify an item or items 46 by reading and processing an optical code on the item(s) 46 (such as a package/box 42 and/or a can 44) during a checkout process in a supermarket or other retail establishment. It should be understood that in certain instances, item(s) 46 may refer to a single item or multiple items being transported and processed in the automated checkout system 10.

In an example operation, a user, which could be either a customer 36 or check-out clerk 38, (collectively/alternately referred to as a "user") places the item(s) 46 onto a leading conveyor section 30 that transports the item(s) 46 in a substantially linear direction of motion 26 toward a scanner unit 12. Preferably, the items 46 are placed on the leading conveyor section 30 sequentially, in single file, to avoid the scanner units 12, 18 mistakenly reading multiple items as a single item. When the item(s) 46 pass through a read zone 13 of the scanner unit 12, various images of the items 46 are captured (including images of a bottom surface of the items 46 captured by a bottom scanner unit 18) and processed to read the barcode or capture other data from the items 46. The images of the items 46 may be presented to the user via a display 150 for verification and/or exception handling purposes as further described below. Thereafter, the items 46 transition onto a trailing conveyor section 32, which may deposit the items 46 into a bagging area 39 where the items 46 may be placed in a bag for the customer 36.

As mentioned previously, during some scanning operations, one or more of the items 46 may have an error (also referred to as an "exception" hereinafter) associated with them. When an exception occurs, barcodes or other data may not be appropriately captured for the item 46, which means the item 46 is not processed by the scanner unit 12. When exceptions occur, information relating to the exception may be presented to the clerk 38 (and/or customer 36) on the display 150 so that the clerk 38 can review and clear the exception (e.g., resolve the problem so that the item 46 is processed). Once the exception is cleared, the item 46 is added to the customer's transaction list and the customer 36 pays for the purchased items and completes the transaction. The following sections describe further details relating to handling exceptions with reference to the figures.

With reference to FIG. 1, the automated checkout system 10 includes a scanner unit 12 installed on a checkout counter 20. The checkout counter unit 20 includes an inlet end 22 and an outlet end 24, and the conveyor sections 30, 32 as described previously. Preferably, the conveyors 30, 32 operate at a constant speed, (e.g., 200-400 millimeters/second (mm/sec)), to optimize the performance of the scanner unit 12 and bottom scanner unit 18. The scanner unit 12 may include data capture devices 14, 16 in the form of arches extending over the conveyors 30, 32. Data capture devices 14, 16 include various components (such as data readers or imagers) for capturing images (such as top views, side views, etc.) or other information corresponding to the items 46 that are moved through a read zone 13 generally defined between the data capture devices 14, 16 of the scanner unit 12. Further details and example embodiments of a scanner unit 12 are described in U.S. Pat. No. 8,746,564, the disclosure of which is incorporated herein by reference. As mentioned previously, the automated checkout system 10 may include a bottom reader section 18 that reads the bottom side of items 46 as they are passed over the gap 31 between the conveyor sections 30, 32. Additional details and example embodiments of such an automated checkout system are further described in U.S. Patent Application Pub. No. 2012/0187195, the disclosure of which is incorporated herein by reference.

FIG. 2 is a block diagram illustrating various components and systems of the automated checkout system 10 of FIG. 1, according to one embodiment. With reference to FIG. 2, the automated checkout system 10 includes (1) a conveyor or conveyor sections 30, 32 that move items 46 through the read zone 13 of the scanner unit 12 and bottom scanner unit 18; (2) the scanner unit 12 and bottom scanner unit 18 capture various images of the optical codes disposed on the items 46; (3) a decoding system 110 that processes and decodes the images acquired by the scanner units 12, 18; (4) and an exception identification system 130 operable to identify when an exception occurs.

In an ideal operation, the automated checkout system 10 successfully reads an optical code and correctly associates the optical code with a single item 46 passing through the read zone 13 of the scanner units 12, 18. However, in some instances, this ideal operation fails, thereby resulting in an exception. As is described in further detail below, various types of exceptions are possible during a typical checkout process. For example, one type of exception corresponds to an event in which an item 46 passes through the scanner units 12, 18, but an optical code from the item 46 is not successfully read. Another type of exception corresponds to an event in which an optical code is read, but the automated checkout system 10 does not detect that an item 46 has passed through the scanner units 12, 18. Another type of exception corresponds to an event in which one optical code read by the scanner units 12, 18 is associated with multiple items 46 passing through automated checkout system 10. Yet another type of exception corresponds to an event in which multiple different optical codes read by system 10 are associated with a single item 46 passing through automated checkout system 10. There are other types of exceptions as well as various subsets of the above-described exceptions that are possible and applicable to the systems/methods described herein even though they are not specifically described in detail.

It should be understood that automated checkout system 10 includes various modules or subsystems that perform various tasks. These subsystems are described in greater detail below. One or more of these systems may include a processor, associated software or hardware constructs, and/or memory to carry out certain functions performed by the systems. The processors of the systems may be embodied in a single central processing unit, or may be distributed such that a system has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

As mentioned previously, the scanner units 12, 18 are each operable to capture images of items 46 as the items 46 are transported along conveyor system 30, 32. The scanner units 12, 18 identify whether optical codes disposed on the items 46 are captured in the images and decode those optical codes that are captured. The scanner units 12, 18 may include different decoders (e.g., software algorithms, hardware constructs) to decode various types of optical codes including one-dimensional (e.g., linear) codes, (e.g., UPC, codabar, code 25, code 39, code 93, code 128, code 11, EAN8, EAN13, plessey, POSTNET) two-dimensional (e.g., matrix) codes (e.g., aztec code, maxicode, QR code, high-capacity color barcode, data matrix) and stacked codes (PDF417, GS1 Databar). In some embodiments, the automated checkout system 10 may include a separate optical decoding system 110 that receives and decodes the optical code from the scanner units 12, 18.

The automated checkout system 10 may include any of a number of suitable exception detection/determination systems. In one example system, an object measurement system 115 is positioned along conveyor system 30, 32 to measure items 46 that are transported along conveyor system 30,32. In one example configuration, the object measurement system 115 generates model data that represents three-dimensional models of the items 46 that are transported along conveyor system 30,32. Further details of an example object measurement system 115 are described in U.S. Pat. No. 8,939,369, the disclosure of which is hereby incorporated by reference.

The scanner units 12, 18 are also operable to generate projection data for optical codes represented in the captured images. The projection data represents back projection rays that project into a three-dimensional view volume of the scanner units 12, 18. These back projection rays are associated with locations of the representations of the optical codes in the images. Details of an example embodiment of such a system are further described in U.S. Pat. No. 8,746,564, the disclosure of which was previously incorporated by reference.

In some embodiments, the automated checkout system 10 may also include an optical code intersection system 125 that is configured to receive the model data from object measurement system 115 and the projection data from the scanner units 12, 18. The optical code intersection system 125 uses the model data and the projection data to determine whether the back projection rays generated for decoded optical codes intersect with the three-dimensional models. Details of an example optical code intersection system 125 are described in U.S. Pat. No. 8,746,564, the disclosure of which was previously incorporated by reference.

In some embodiments, the automated checkout system 10 may include an exception identification system 130 in communication with the optical code intersection system 125. The exception identification system 130 identifies whether exceptions occur based on intersection determinations made by the optical code intersection system 125. For example, if an object passes through automated checkout system 10 and the object measurement system 115 generates a three-dimensional model of the object, but no back projection ray of an optical code intersects with the three-dimensional model, exception identification system 130 identifies this event as an exception. The exception identification system 130 may also be operable to classify and categorize exceptions by types and subtypes and to generate exception category identification information indicative of the exception types and/or subtypes. In other embodiments, exceptions may also be identified by comparing the dimensions or volume of the three dimensional item model to dimensions or volume values obtained from a stored list of dimension and volume values which are associated with specific bar code values or ranges of bar code values.

The automated checkout system 10 may also include an exception handling system 135 in communication with exception identification system 130. The exception handling system 135 determines how to handle or resolve an exception identified by the exception identification system 130 based on the exception's type. To this end, the exception category identification information generated by the exception identification system 130 is communicated to the exception handling system 135. The exception handling system 135 is operable to determine that an exception should be resolved in one of multiple ways. For example, the exception handling system 135 may determine that an exception is to be automatically resolved by ignoring the exception or manually resolved by an operator. The exception handling system 135 may communicate with a storage device 140 that stores various types of information associated with exceptions.

In some embodiments, the storage device 140 (or other database, not shown) may include stock item information (e.g., barcodes, identification information, price data, etc.) for each of the items 46 that may be available or in inventory for a given retail establishment. In such embodiments, the exception handling system 135 is operable to call up the stock item information on any item 46 based on its barcode and display that information for a user to assist in clearing exceptions. For instance, the exception handling system 135 may display the description and price of an item based on the captured barcode. In some instances, the scanner units 12, 18 may capture a partial barcode (such as when items 46 are too close and one item obscures the barcode of a neighboring item). In such instances, the exception handling system 135 may be configured to generate information for all barcodes that match the captured portion of the barcode and display all the potential matches on the display screen 150 for the user so that the exception may be cleared. Further details of such embodiments are described in U.S. Pat. Pub. No. 2015/0193761, the disclosure of which is incorporated herein by reference.

In some embodiments, the automated checkout system 10 may also include an object annotation system 145 that is operable to generate annotated image data corresponding to visual representations of exceptions to enable a user (e.g., a customer 36 or clerk 38) to easily identify which items 46 have exceptions associated with them. The annotated image data generated by object annotation system 145 are communicated to the display screen 150, which displays the visual representations of the exceptions. Further details and example embodiments of an exception handling system 135 and an object annotation system 145 are described in U.S. Pat. Nos. 8,939,369 and 9,082,142, the disclosures of which are hereby incorporated by reference.

Once the exception identification system 130 identifies an exception and generates the exception category identification information, the exception handling system 135 determines how to resolve the exception. Exceptions can be resolved in various ways, such as (1) ignore the exception, (2) automatically resolve the exception, and (3) manually resolve the exception by the clerk 38. The exception handling system 135 may be user-programmable to handle various exceptions in different ways. Various examples of an exception handling system 135 capable of automatically resolving exceptions (e.g., without input from the customer 36 or clerk 38) are described in U.S. Pat. Nos. 8,939,369 and 9,082,142, the disclosures of which were previously incorporated by reference. With respect to FIGS. 3-5, the following section describes an exception handling method 200 for resolving various exceptions, and also describes details relating to an input verification system 155 (and related method of operation) operable to track the user input to assess the accuracy of individual operators performing the exception handling actions, and an item feedback system 160 (and related method of operation) that uses the accuracy assessment as feedback for enhancing and improving the data reading process.

Figure 3:
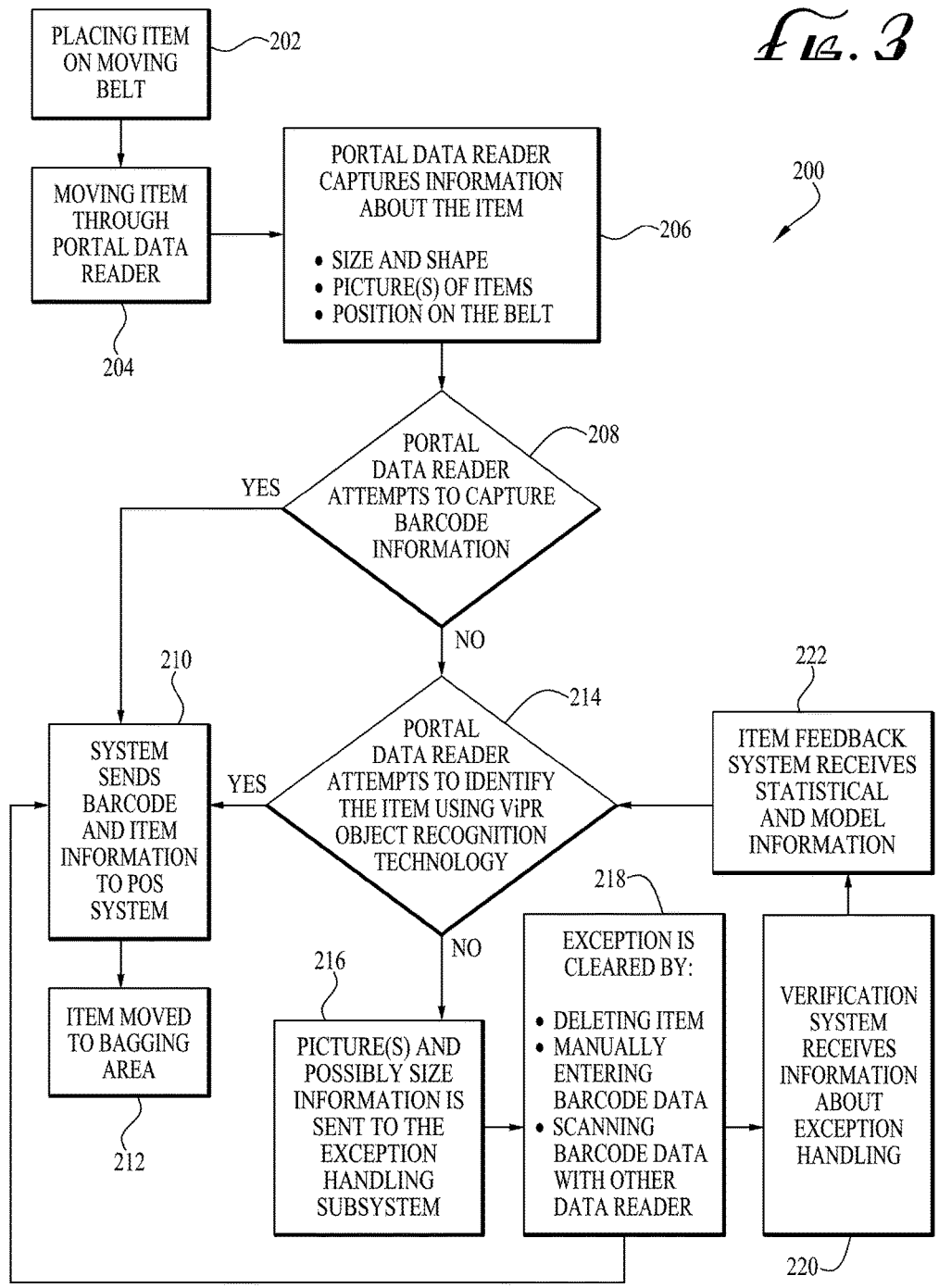
FIG. 3 is a flowchart of a data reading process performed the automated data reading system of FIG. 1.

FIG. 3 is a flowchart of an example exception handling method 200 according to one embodiment, comprising the following steps. At step 202, the transaction begins when a user places one or more items on the moving conveyors as described previously. At step 204, the item(s) are moved via the conveyor through a read region of the data reading devices. At step 206, the data reading devices (e.g., the portal data reader) capture information about the item, such as item size, item shape, position of the item on the conveyor, and a picture/image of the item. At step 208, the data reading devices attempt to capture and decode optical code information from the item. If the decoding process is successful, at step 210, the data reading devices transmit barcode and item information to the point-of-sale system for adding to the customer's transaction. Thereafter, at step 212, the item is moved to a bagging area.

If the decoding process is unsuccessful, at step 214, the data reading devices attempt to identify and process the item using any one of a variety of suitable object recognition models. For example, the data reading devices may attempt to identify the item using object recognition techniques such as ViPR® object recognition technology available from Datalogic ADC, Inc. of Eugene Oreg. This type of object recognition employs identification of scale-invariant feature transformation (SIFT) features on the objects to perform object recognition. However, other forms of object recognition such as SURF (speeded up robust features) and BOLD (bunch of lines descriptor) can also be used. Additional details of feature comparison and object recognition techniques are described in U.S. Patent Application Publication No. 2011/0286628, titled, "Systems and Methods for Object Recognition Using a Large Database," the disclosure of which is hereby fully incorporated by reference. Additional details relating to a method of object recognition is described in U.S. Pat. No. 6,711,293, titled, "Method and Apparatus for Identifying Scale Invariant Features in an Image and Use of Same for Locating an Object in an Image," the disclosure of which is hereby fully incorporated by reference. From step 214, if the object recognition technology successfully identifies the item, the method proceeds to step 210 where the item is added to the customer's transaction and moved to the bagging area at step 212 as described previously. Otherwise, the method proceeds to step 216 (exception handling).

From an unsuccessful identification at steps 208 and 214, exception information (such as digital photographs and item size information acquired by the data reading devices) is sent, at step 216, to the exception handling subsystem for handling. At step 218, the exception may be cleared by the user in any one of a variety of steps. For example, the exception handling system may delete the item from the transaction and instruct the user to rescan the item; or the user may manually enter the optical code data, such as via the display, either from direct view of the item itself or by examining the digital photograph of the item; or the user may scan the optical code on the item with another data reader, such a handheld device; or the exception handling system may present the exception image on the display for review by the user along with one or more selectable icons, such as barcode data, item description, SKU data, or other data, whereby the user selects one of the selectable icons to clear the exception. Once the exception is cleared, the barcode and item information are sent to the point-of-sale system (step 210) and the item is moved to the bagging area (step 212).

As described previously with reference to FIG. 2, the automated checkout system 10 includes a verification system 155 in communication with the exception handling system 135. The verification system 155 is configured to verify the accuracy of the exceptions handled by the user to help detect user error and/or intentionally fraudulent transactions (e.g., the user may try to associate an expensive item with a barcode for an inexpensive item). In some embodiments, the verification system 155 may compare the exception image to a matching or similar stock image (with a known barcode) of the item stored in the storage 140. If the barcode/information associated with the stock image does not match the barcode selected by the user, the display 150 may alert the customer 36 and/or the clerk 38 of the possible mistake.

For instance, in some embodiments, the verification system 155 may compare visual recognition features (such as scale-invariant feature transform (SIFT)) from the captured image(s) of the exception items 46 with visual features or markers for known items (e.g., all inventory items) in the storage 140. After the user handles any exceptions for items that were not properly read, the verification system 155 may query the storage 140 in search of one or more items that may be a likely match to the exception item based on the captured visual recognition features. Thereafter, the verification system 155 compares the barcode information input by the user on the display 150 with the barcode information for any matching items returned by the query. If the verification system 155 determines that the input information matches the stored information in the storage 140 for at least one known item, then the verification system 155 may verify that the exception was properly handled by the user. If no matches are found, then the verification system 155 may alert the user, such as via a message delivered on the display 150, that the exception was not properly handled. In some embodiments, the input information, exception images, and other data may be automatically recorded for further analysis by a manager or other personnel in order to understand the root cause and possibly to allow the manager to change the evaluation and score of the operator/clerk if deemed necessary. The information and follow up analysis may also help to detect suspicious behaviors by comparing proposals from the verification system and the input information from the operator/clerk.

Turning back to FIG. 3, the exception is cleared as described previously at step 218, and the system thereafter sends barcode and item information to the point-of-sale system at step 210. In addition, after the exception is successfully cleared by the user at step 218, the verification system 155 (and/or the exception handling system 135) receives information on the user's actions for handling the exception at step 220. For example, the verification system 155 (and/or exception handling system 135) may receive information that: (a) the user accepted the suggestions proposed by the exception handling system to resolve the exception; or (b) the user rejected the suggestion and rescanned the item to resolve the exception; or (c) the item was discarded and placed back on the conveyor, where the item was successfully read after reprocessing. Information corresponding to the way in which the operator resolves the exception may be stored in storage device 140 for future reference and use by the verification system 155 (and/or exception handling system 135).

At step 222, the item feedback system 160 receives the exception-handling information from the verification system 155 (and/or exception handling system 135 or other system of the data reader 10) and analyzes the information corresponding to resolution of prior exceptions to determine whether and how to modify the exception handling process and/or the object recognition models to address how future exceptions (e.g., future exceptions with the same category label) are to be resolved. The analysis information from the verification system 155 and/or the feedback system 160 is returned to the portal data readers to improve the data reading process based on the operator's actions in handling previous exceptions. In this fashion, the data readers are able to learn and adapt based on operator action. Further details and examples relating to process steps 220 and 222 and methods for modifying the exception handling process and/or the object recognition models are provided with particular reference to FIGS. 4 and 5 below.

Figure 4:
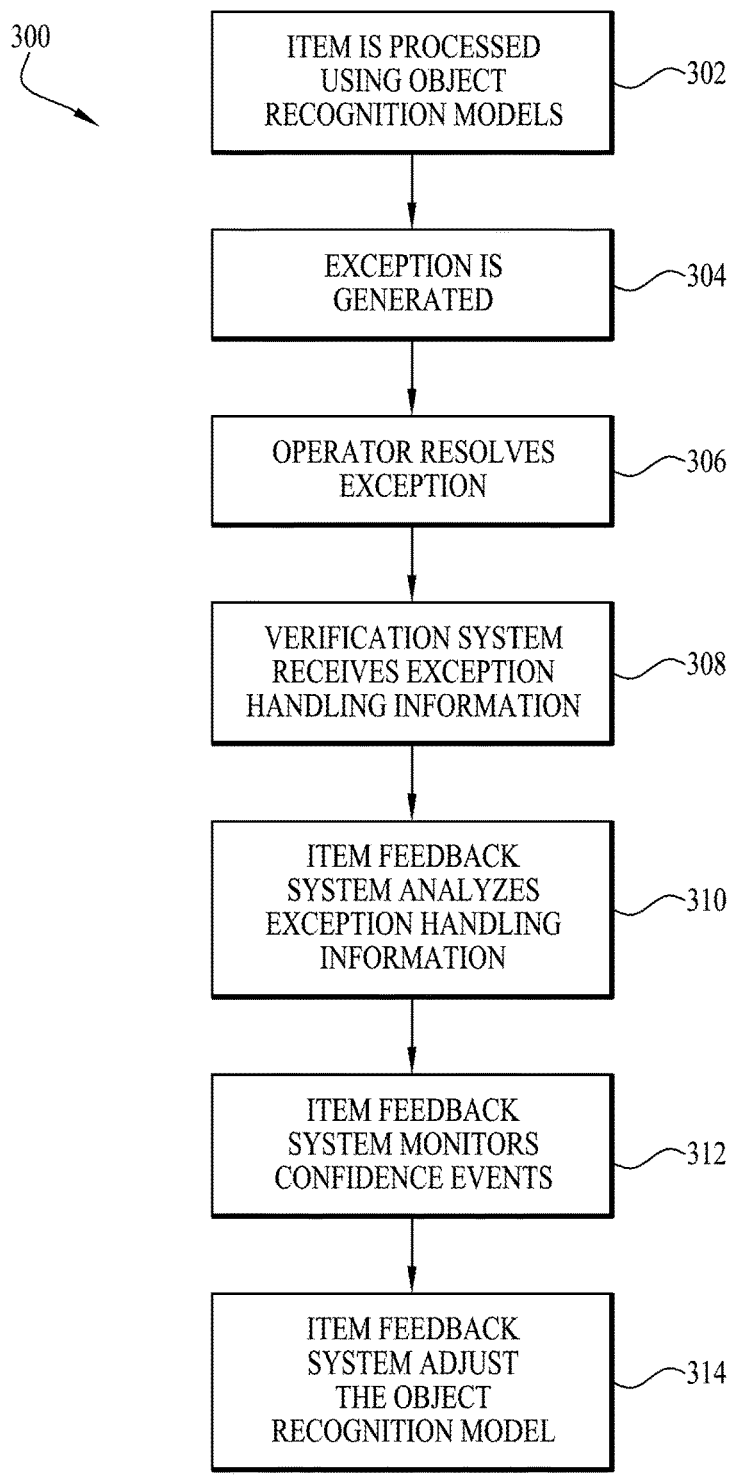
FIG. 4 is a flowchart of one embodiment of an exception handling and feedback process performed by the automated data reading system of FIG. 1.
Figure 5:
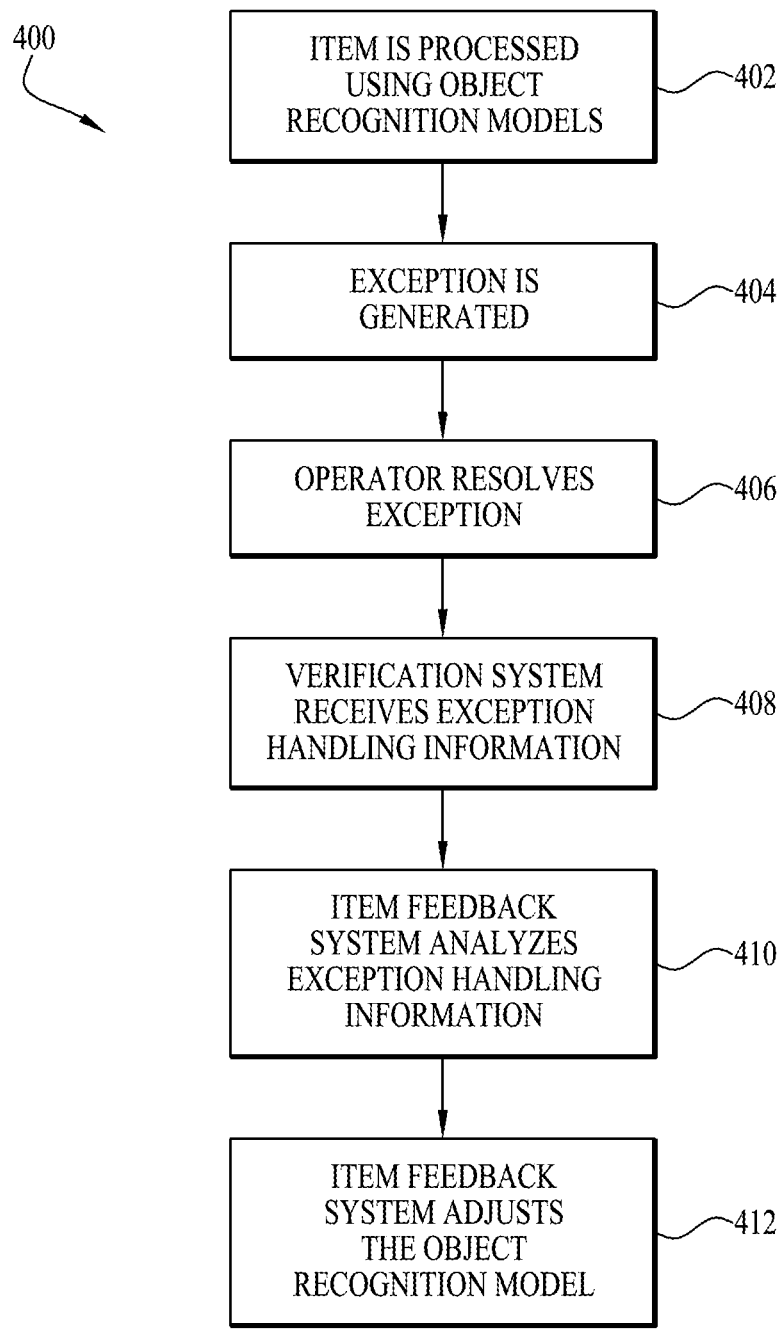
FIG. 5 is a flowchart of another embodiment of an exception handling and feedback process performed by the automated data reading system of FIG. 1.

As mentioned previously with respect to step 214, the portal data readers 12 may attempt to identify and process the item 46 using any one of a variety of suitable object recognition models when the optical decoding system 110 is unable to decode the item 46. Typically, the object recognition models attempt to use visual pattern recognition techniques to assist in identifying the items that were not properly scanned. However, because such models tend to be created in advance, there is limited ability to validate the worth of the model during use. Accordingly, a bad initial model may generate many unwarranted exceptions (e.g., false positives for validation), or provide incorrect detection results (e.g., visual pattern recognition), thereby limiting the value of automated data reading systems. FIGS. 4 and 5 below provide additional embodiments for using operator feedback to adjust the object recognition models over time based on the operator's handling of various types of exceptions.

FIG. 4 is a flowchart of an exception handling and feedback process 300 performed by the automated data reading system of FIG. 1 in accordance with one embodiment. In FIG. 4, some steps of the process 300 may be the same or similar as corresponding steps described in the process 200 of FIG. 3. Accordingly, the following description will not discuss these steps in further detail with the understanding that they may be the same or similar as the corresponding steps of process 200.

With reference to FIG. 4, in the case where the portal data readers fail to decode the optical code, the item is thereafter processed using object recognition models at step 302 (similar to step 214 described previously). As noted above, the models may include specific algorithms that are initially pre-programmed, and modified based on operator exception handling (as further described below in steps 308-312). At step 304, an exception is generated that may be related to any one of a variety of conditions relating to the failed data reading event. For example, the exception may be generated because the item cannot be read, or because multiple barcodes are found for one item, or because the item shape does not match with the identified barcode. At step 306, the operator resolves the exception and the item is added to the customer transaction list.

At step 308, the exception information and exception handling actions by the operator are received by the verification system 155 and/or the item feedback system 160. For example, in the case when the data readers capture a single item and two barcodes, the operator may select and accept one of the two captured barcodes to resolve the exception. In the case when there is a single item captured and one barcode, but the 3-D volume of the item does not sufficiently match the expected 3-D volume of the item as stored in the storage 140, the operator may override the volume exception and accept the item and barcode.

At step 310, the item feedback system 160 receives the exception-handling information and analyzes the information to determine whether and how to modify the object recognition model to improve the data reading process as needed. The item feedback system 160 may make this determination based on a variety of suitable factors and conditions. In addition, since the operator handling and feedback may vary from operator to operator, the feedback system 160 may determine whether and how to modify the model based on the identity of the operator. These and other analysis methods are described in further detail below.

In one analysis technique, the item feedback system 160 may track and analyze the exception handling information based on individual operators since the performance of individual operators may vary based on a number of factors (e.g., experience, training, habits, etc.). In such embodiments, each operator may provide identification information to the portal data readers prior to use. For example, each operator may log-in to the data reading system with his or her credentials, such as user name and password, employee ID number, or other suitable information. Thereafter, the item feedback system 160 tracks the actions for each operator.

Each of the operators is evaluated and scored relative to each other and assigned a weight correlation factor to their feedback (e.g., their exception handling actions) to account for operator behavior patterns. The weight correlation factor may be based on a variety of factors. For example, in one embodiment, the weight correlation factor may be partly determined from an operator's acceptance rate of their exception items based on an expected acceptance rate given the heuristic expected success/failure rates of the object recognition model for specific types of exceptions. Users who accept (or fail to accept) items at a rate exceeding a predetermined threshold may be assigned low weight correlation factors, as these operators are unlikely to be accurately evaluating the exception information since they are accepting too many items, thereby having a low reliability score. In addition, users who accept items at a rate close to the expected acceptance rate (e.g., within a 10% range of the expected acceptance rate) may be assigned high weight correlation factors, as these operators are likely to be more accurate in their exception evaluation.

For example, in one object recognition model, the expected acceptance rate for a volume exception (e.g., when the system captures a single item and barcode, but the measured item volume exceeds the expected volume based on the model) may be 75%. That is, 75% of the time the object recognition model expects an operator to override the volume exception and accept the item. Over time, the data reading system continuously monitors how every operator handles this particular exception. Operator 1 may have a 25% acceptance rate for these volume exceptions, while Operator 2 may have a 66% acceptance rate, and Operator 3 may have a 98% acceptance rate. Based on the expected acceptance rate of 75%, the system may assign a high correlation factor to Operator 2 because that operator is performing closely to expectations, while Operators 1 and 3 may have lower correlation factors, since Operator 1 is likely failing to accept or rejecting too many items, while Operator 3 is likely accepting too many items. In other words, Operators 1 and 3 are deemed to be less reliable than Operator 2. In some embodiments, the weight correlation factor may be further impacted by the volume or sample size of exception items handled by the operator. For example, operators handling a large number of exception items may have a higher weight correlation factor than those having a small sample size.

In a second analysis technique, a store manager, trainer, or other management personnel may assign weight correlation factors to individual operators based on experience, level of training, and other "trusted" operators, such as those that the store manager believes are operating the data reading system in good faith. In other embodiments, the first and second analysis methods may be combined to define an overall weight correlation factor, such as by having the system modify the initial weight correlation factor assigned by the store manager.

In a third analysis technique, each operator may be assigned a relatively low weight correlation factor so that individual operators and actions have a small impact on the determination of whether and how to modify the model as further described in detail below. In such embodiments, the item feedback system may instead rely on large sample sizes for each different kind of exception handling action from all operators using the data reading devices to weight the models. In other words, the item feedback system will determine how to modify the object recognition model based on the cumulative number of exception handling actions, while minimizing reliance on the actions of particular operators.

In some embodiments, the item feedback system 160 may be in communication with the storage device 140 containing the stock item information for each item 46. In such embodiments, the item feedback system 160 may query the storage device 140 and compare the stock item information with the exception handling input used by the operator to resolve the exception, and determine whether the received exception handling input corresponds to the stock item information for the exception item. If the item feedback system 160 determines that the exception handling input and stock item information do not match, then the item feedback system 160 may alert the user (such as by presenting a message via the display 150), and adjust (e.g., decrease) the weight correlation factor for the operator due to the error. Similarly, if the item feedback system 160 determines that the exception handling input and stock item information do match, then the item feedback system 160 may increase the weight correlation for the operator. In this fashion, operators that make many errors will have lower correlation scores as compared to operators that make few errors.

Once the weight correlation factor is assigned for each operator, at step 312, the item feedback system monitors and records confidence events based on the exception handling actions of the operator. Positive and negative confidence events (as explained in further detail below) are recorded along with the user weight correlation factor for the operator handling the exception and the date/time of the exception-handling action. Based on the confidence event data and user weight correlation factor data, the object recognition model is updated accordingly. In some embodiments, the object recognition model may decay over time using the date/time information of the exception-handling action, such that recent actions are more heavily-weighted for each of the operators as compared to older or earlier actions.

The following provides examples of how the data reading system may combine user feedback (including weight correlation factors) and confidence events to validate and/or improve the object recognition model based on operator handling of various types of exceptions, such as volume exceptions, no-read exceptions, and overpack exceptions. Examples relating to each of these exceptions is briefly described below.

Example 1: Volume Exceptions

As mentioned previously, a volume exception occurs when the data reading system captures a single item and a single barcode during a reading event, but the measured volume of the item does not match the expected volume of the item based on the captured barcode and the object modeling algorithm. For example, the item may be a cereal box and the barcode may be for a specific brand of cereal, but the measured volume of the item is smaller than what would be expected from the object modeling algorithm. In such cases, where the statistical shape model does not provide a match to the actual exception item, but the operator resolves the exception by accepting the item anyway, the item feedback system records a negative confidence event to indicate that the shape model may be too sensitive and does not accurately reflect the shape of the item. The negative confidence event indicates that an adjustment of the model may be needed.

In another example, the item may be a flexible package like a bag of noodles, and the object modeling algorithm may be created with little variation in the bag placement on the conveyor belt. In some instances, the bag of noodles may be placed on the belt with a lot of deformity such that the measurement obtained from the data reading system is outside or different than what would be expected from the object modeling algorithm. In such instances, the statistical shape model does not match the item, but the cashier continues scanning additional items indicating that there was no volume exception error. In these cases, the system records a positive confidence event to indicate that the shape model is working properly. In this fashion, the self-learning database uses the exception-handling actions performed by the operators/cashiers to teach and adjust the object modeling algorithm.

Returning to FIG. 4, at step 314, the item feedback system may adjust the object recognition models when the total of the confidence events and the weighted correlation factors (as monitored for each user) exceeds a predetermined threshold for applying the modeling changes. The particular details of the modeling changes may be different based on the variety of exception handling scenarios. In the volume exception example, a high positive confidence event feedback (which indicates the model is working very well) may cause the feedback system to adjust the model to reduce the threshold for mismatches and minimize exceptions. In addition, a low positive confidence event feedback may result in minor or no changes to the model, since the feedback indicates that the model appears to be working properly.

On the other hand, a low negative confidence event feedback may cause the feedback system to adjust the model to increase the threshold for mismatches since it seems the model is not quite working adequately. Finally, a high negative feedback may cause the feedback system to delete and rewrite the existing model based on subsequent data reading events.

Example 2: No-Read Exceptions

A no-read exception occurs when the data reading system captures an image of the item, but fails to capture a corresponding barcode. In such embodiments, the exception handling system may present a suggested item to handle the exception based on visual recognition and object modeling algorithms. For example, the item may be a soda bottle and the data reading system may display an image of a soda bottle (when working properly) or may display an image of a wine bottle (when working improperly). When handling a no-read exception, if the operator declines the item presented by the exception handling system and otherwise resolves the exception, then the item feedback system records a negative confidence event to indicate that the modeling is not accurate. Alternatively, if the operator accepts the item, then the item feedback system records a positive confidence event to indicate that the model is accurate.

Returning to FIG. 4, at step 314, the item feedback system may adjust the object recognition models when the total of the confidence events and the weighted correlation factors (as monitored for each user) exceeds a predetermined threshold for applying the modeling changes. The particular details of the modeling changes may be different based on the variety of exception handling scenarios. For no-read exceptions, a high positive confidence event feedback (which indicates the model is working very well) may cause the feedback system to increase the match/rank scores for particular items. For items with high match/rank scores, the exception-handling system may be more accurate when suggesting possible matches to users for handling no-read exceptions. In addition, a low positive confidence event feedback may result in minor or no changes to the model, since the feedback indicates that the model appears to be working at an appropriate level. On the other hand, a low negative confidence event feedback may decrease the match/rank scores for particular items, and a high negative feedback may cause the feedback system to rewrite the existing model and/or add the item to an exclusion list that will automatically trigger a re-scanning request since the exception-handling system and modeling algorithm cannot resolve that exception appropriately.

In some embodiments, if the operator declines the suggested item presented by the exception handling system and instead scans a different item, then the item feedback system may record an alternate barcode event. Continuous alternate barcode events with high positive confidence event feedback for specific items may adjust the model so that when the specific item triggers a no-read exception, the alternately scanned item may be presented to the user as a suggested item for resolving the exception.

Example 3: Overpack Exceptions

An overpack exception occurs when the data reading system captures multiple barcodes for a single item. In such embodiments, if the operator resolves the exception by selecting one of the multiple barcode, the item feedback system may record a paired barcode event. Overtime, if multiple reads of a specific item are always resolved by the operator selecting one of the available barcodes, the item feedback system may adjust the object recognition models so that the non-reported barcodes are moved to a secondary list of possible resolutions or eliminated altogether as possible resolutions for the exception.

FIG. 5 is a flowchart of an exception handling and feedback process 400 performed by the automated data reading system of FIG. 1 in accordance with one embodiment. In FIG. 5, some steps of the process 400 may be the same or similar as corresponding steps described in the process 200 of FIG. 3 and in the process 300 of FIG. 4. Accordingly, the following description will not discuss these steps in further detail with the understanding that they may be the same or similar as the corresponding steps of process 200, 300.

With reference to FIG. 5, in the case where the portal data readers fail to identify a barcode for an item, the item is thereafter processed using object recognition models at step 402 (similar to step 214 described previously). As noted above, the models may include specific algorithms that are initially pre-programmed, and modified based on operator exception handling (such as described previously in steps 308-312). At step 404, an exception is generated and one or more possible barcode matches are identified and presented to the operator. For example, the display may present to the operator: (1) multiple potential item matches based on the object recognition models, or (2) may present a single item match, or (3) may alert the operator that there are no matches. At step 406, the operator resolves the exception and the item is added to the customer transaction list.

At step 408, the exception information and exception handling actions by the operator are received by the verification system 155 and/or the item feedback system 160. For example, in scenario (1) above when multiple items are suggested, the systems 155, 160 track which item was selected by the operator, or if none were accepted, then track which barcode was used to resolve the exception. In scenario (2), the systems 155, 160 track whether the item match was accepted or rejected, and if rejected, which barcode was used to resolve the exception. In scenario (3), the systems 155, 160 track what barcode was scanned to resolve the exception.

At step 410, the item feedback system 160 receives the exception-handling information and analyzes the information to determine whether and how to modify the object recognition model to improve the data reading process as needed. The item feedback system 160 may make this determination based on a variety of suitable factors and conditions. In addition, since the operator handling and feedback may vary from operator to operator, the feedback system 160 may determine whether and how to modify the model based on the identity of the operator at step 412.

For example, in scenario (1), if the operator selects the same barcode for one particular exception item that always generates multiple barcode selections, then the confidence of that barcode selection is increased for that exception item. Once that confidence exceeds a threshold level over time (based on the number of confidence events as described previously), the model may be adjusted and the system may present only that barcode to handle future exceptions. Similarly, in scenario (2), the confidence of a particular barcode may be increased if the single barcode is always accepted, or decreased if the single barcode is always rejected. In scenario (3), based on the scanned barcodes to resolve the exception, the model may learn to associate the scanned barcode with the exception item.

It is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An automated optical code reading and control system, comprising
   a data reader including an object recognition model, the object recognition model including one or more algorithms defining parameters for identifying items passing through a read zone of the data reader;
   a conveyor system configured to transport items through the read zone of the data reader;
   an exception identification system configured to detect an exception item that has been transported into the read zone without being successfully identified by the data reader;
   an exception handling system configured to receive exception handling input for resolving an exception associated with the exception item;
   a feedback system in operable communication with the object recognition model and the exception handling system, the feedback system configured to receive the exception handling input associated with handling the exception, the feedback system further configured to update the one or more algorithms to adjust the parameters of the object recognition model based, at least in part, on the exception handling input; and
   an input mechanism for receiving a weight correlation factor for each of one or more operators of the data reader, and wherein the one or more algorithms of the object recognition model is updated based, at least in part, on the weight correlation factor.

2. The system of claim 1, further comprising:
   an imaging system configured to acquire an exception image of the exception item; and
   a display having a display screen configured to: (a) present the exception image of the exception item, and (b) receive the exception handling input for resolving the exception.

3. The system of claim 2, wherein the display screen is further configured to present the exception image and one or more selectable icons for resolving the exception.

4. The system of claim 3, wherein the exception identification system is further configured to generate the one or more selectable icons for resolving the exception based in part on the exception handling input.

5. The system of claim 1, further comprising a database having stored therein stock item information for the exception item, wherein the feedback system is in operable communication with the database, the feedback system configured to query the database, compare the stock item information for the exception item with the exception handling input for resolving the exception, and determine whether the received exception handling input corresponds to the stock item information for the exception item.

6. The system of claim 5, wherein the feedback system is further configured to generate a second weight correlation factor for each of one or more operators of the data reader and store the second weight correlation factor in a memory of the data reader, wherein the second weight correlation factor is based, at least in part, on the determination of whether the received exception handling input corresponds to the stock item information for the exception item, and wherein the one or more algorithms of the object recognition model is updated based, at least in part, on the second weight correlation factor.

7. A method of operation for an automated data reading system, comprising the steps of:
   moving, via a conveyor, items along an item path through a read zone of a data reader, the data reader including an object recognition model, the object recognition model including one or more algorithms defining parameters for identifying items passing through the read zone;
   detecting, via an exception identification system, an exception item that has been transported into the read zone of the data reader without successful identification by the data reader;
   resolving, via an exception handling system, an exception associated with the exception item by receiving exception handling input;
   receiving, via a feedback system, the exception handling input associated with handling the exception;
   determining, via the feedback system, adjustment instructions for updating the one or more algorithms of the objection recognition model based on the exception handling input;
   adjusting the one or more algorithms of the object recognition model based on the adjustment instructions,
   querying, via the feedback system, a database having stored therein stock item information for the exception item, wherein the feedback system is in operable communication with the database, to compare the stock item information for the exception item with the exception handling input for resolving the exception;
   determining, via the feedback system, whether the received exception handling input corresponds to the stock item information for the exception item;
   generating, via the feedback system, a weight correlation factor for each of one or more operators of the data reader based, in part, on the determination of whether the received exception handing input corresponds to the stock item information for the exception item; and
   adjusting, via the feedback system, the one or more algorithms of the object recognition model based at least in part on the weight correlation factor.

8. The method of claim 7, further comprising:
   capturing, via an imaging system, an exception image of the exception item as the exception item is moved along the item path through the read zone;
   displaying, via a display system, the exception image of the exception item on a display screen; and
   receiving, via the display system, the exception handling input for resolving the exception.

9. The method of claim 8, further comprising, presenting, via the display system, the exception image and one or more selectable icons for resolving the exception.

10. The method of claim 9, further comprising, generating, via the exception identification system, the one or more selectable icons for resolving the exception based in part on the exception handling input.

11. The method of claim 7, further comprising:
    receiving, via an input mechanism, a second weight correlation factor for each of one or more operators of the data reader; and
    adjusting the one or more algorithms of the object recognition model based at least in part on the second weight correlation factor for each of the one or more operators of the data reader.

12. An automated optical code reading and control system, comprising
    a data reader including an object recognition model, the object recognition model including one or more algorithms defining parameters for identifying items passing through a read zone of the data reader;
a conveyor system configured to transport items through the read zone of the data reader;
an exception identification system configured to detect an exception item that has been transported into the read zone without being successfully identified by the data reader;
an exception handling system configured to receive exception handling input for resolving an exception associated with the exception item;
a feedback system in operable communication with the object recognition model and the exception handling system, the feedback system configured to receive the exception handling input associated with handling the exception, the feedback system further configured to update the one or more algorithms to adjust the parameters of the object recognition model based, at least in part, on the exception handling input;
a database having stored therein stock item information for the exception item, wherein the feedback system is in operable communication with the database, the feedback system configured to query the database, compare the stock item information for the exception item with the exception handling input for resolving the exception, and determine whether the received exception handling input corresponds to the stock item information for the exception item; and
wherein the feedback system is further configured to generate a weight correlation factor for each of one or more operators of the data reader and store the weight correlation factor in a memory of the data reader, wherein the weight correlation factor is based, at least in part, on the determination of whether the received exception handling input corresponds to the stock item information for the exception item, and wherein the one or more algorithms of the object recognition model is updated based, at least in part, on the weight correlation factor.

13. The system of claim 12, further comprising:
an imaging system configured to acquire an exception image of the exception item; and
a display having a display screen configured to: (a) present the exception image of the exception item, and (b) receive the exception handling input for resolving the exception.

14. The system of claim 13, wherein the display screen is further configured to present the exception image and one or more selectable icons for resolving the exception.

15. The system of claim 14, wherein the exception identification system is further configured to generate the one or more selectable icons for resolving the exception based in part on the exception handling input.

16. The system of claim 12, further comprising an input mechanism for receiving a second weight correlation factor for each of one or more operators of the data reader, and wherein the one or more algorithms of the object recognition model is updated based, at least in part, on the second weight correlation factor.

* * * * *